United States Patent
Lin

(10) Patent No.: US 6,317,992 B1
(45) Date of Patent: Nov. 20, 2001

(54) ANGLE ROTATING DEVICE FOR WHEEL ALIGNMENT TEST

(76) Inventor: Tswen-Jang Lin, 58, Ma Yuan West St., Taichung (TW)

(*) Notice: Subject to any disclaimer, the term of this patent is extended or adjusted under 35 U.S.C. 154(b) by 0 days.

(21) Appl. No.: 09/338,853

(22) Filed: Jun. 25, 1999

(51) Int. Cl.[7] ................................................. G01B 5/24
(52) U.S. Cl. ............................... 33/203.14; 33/203.12; 33/569; 33/573
(58) Field of Search ................................ 33/203, 203.12, 33/203.14, 568, 569, 570, 573, 1 N, 1 PT, 203.13, 203.21; 248/282.1, 289.11, 130, 131

(56) References Cited

U.S. PATENT DOCUMENTS

| | | | |
|---|---|---|---|
| 2,125,534 | * 8/1938 | Wochner | 33/203 |
| 2,503,580 | * 4/1950 | Fontaine | 33/203 |
| 2,648,139 | * 8/1953 | Wilkerson | 33/203 |
| 4,897,926 | * 2/1990 | Altnether et al. | 33/203.14 |
| 5,604,296 | * 2/1997 | Nozaki | 33/203.12 |

* cited by examiner

Primary Examiner—Diego Gutierrez
Assistant Examiner—Lydia M. De Jesús

(57) ABSTRACT

An angle rotating device for wheel alignment test has a disk seat, a lever bar inserted in the disk seat, a cover plate covering the disk seat, a solid rotating disk disposed on the cover plate, a ring disposed in the solid rotating disk, and a hollow disk disposed in the cover plate. The solid rotating disk has a center shaft. The ring has an annular face having a plurality of circular apertures receiving a plurality of balls. A sleeve is disposed in a center of the ring. A plurality of springs are connected to the sleeve and the ring.

2 Claims, 6 Drawing Sheets

ANGLE ROTATING DEVICE FOR WHEEL ALIGNMENT TEST

BACKGROUND OF THE INVENTION

The present invention relates to an angle rotating device for wheel alignment test. More particularly, the present invention relates to an angle rotating device for wheel alignment test which can sense a deflection angle of a wheel sensitively.

Referring to FIGS. 1, 2, and 2A, an angle rotating device A for wheel alignment test of the prior art has a cover plate A3, a solid rotating disk A1 disposed on the cover plate A3, a ring A2 disposed in the solid rotating disk A1, a movable rack A4 disposed on a bottom of the cover plate A3, and a movable plate A5 confined by the movable rack A4. The solid rotating disk A1 has a center shaft A11. The ring A2 has an annular face A21 having a plurality of circular apertures receiving a plurality of balls A22. A sleeve A24 is disposed in a center of the ring A2. A plurality of springs A23 are connected to the sleeve A24 and the ring A2. The cover plate A3 has a center hole A32 and a plurality of cage posts A31 confining the movable rack A4. The movable rack A4 has two transverse plates A41, two longitudinal plates A42, and a spacing A43 defined by the transverse plates A41. The movable plate A5 has a round hole A51. The spacing A43 receives the movable plate A5. The center shaft A11 passes through the sleeve A24, the center hole A32, and the round hole A51. Referring to FIG. 1 again, a wheel B presses the angle rotating device A for wheel alignment test of the prior art. Since the cage posts A31 contact the movable rack A4, the friction between the cage post A31 and the movable rack A4 will be very large. Therefore, the angle rotating device A for wheel alignment test cannot sense a deflection angle of the wheel B sensitively.

SUMMARY OF THE INVENTION

An object of the present invention is to provide an angle rotating device for wheel alignment test which can sense a deflection angle of a wheel sensitively.

Accordingly, an angle rotating device for wheel alignment test comprises a disk seat, a lever bar inserted in the disk seat, a cover plate covering the disk seat, a solid rotating disk disposed on the cover plate, a ring disposed in the solid rotating disk, and a hollow disk disposed in the cover plate. The disk seat has a sector recess, two arc recesses, a center groove, a round aperture, and a center aperture. The lever bar has an oblong hole, a round hole, and a circular hole. The hollow disk has a center through hole. The cover plate has a round opening receiving an upper portion of the hollow disk. The solid rotating disk has a center shaft. The ring has a central hole, an annular face having a plurality of circular apertures receiving a plurality of balls. A sleeve is disposed in the central hole of the ring. A plurality of springs are connected to the sleeve and the ring. The sector recess of the disk seat receives the lever bar. The circular hole of the lever bar matches the round aperture of the disk seat. A bolt is inserted in the round hole of the lever bar. The center shaft passes through the sleeve, the center through hole, and the oblong hole.

DETAILED DESCRIPTION OF THE INVENTION

Figure 1:
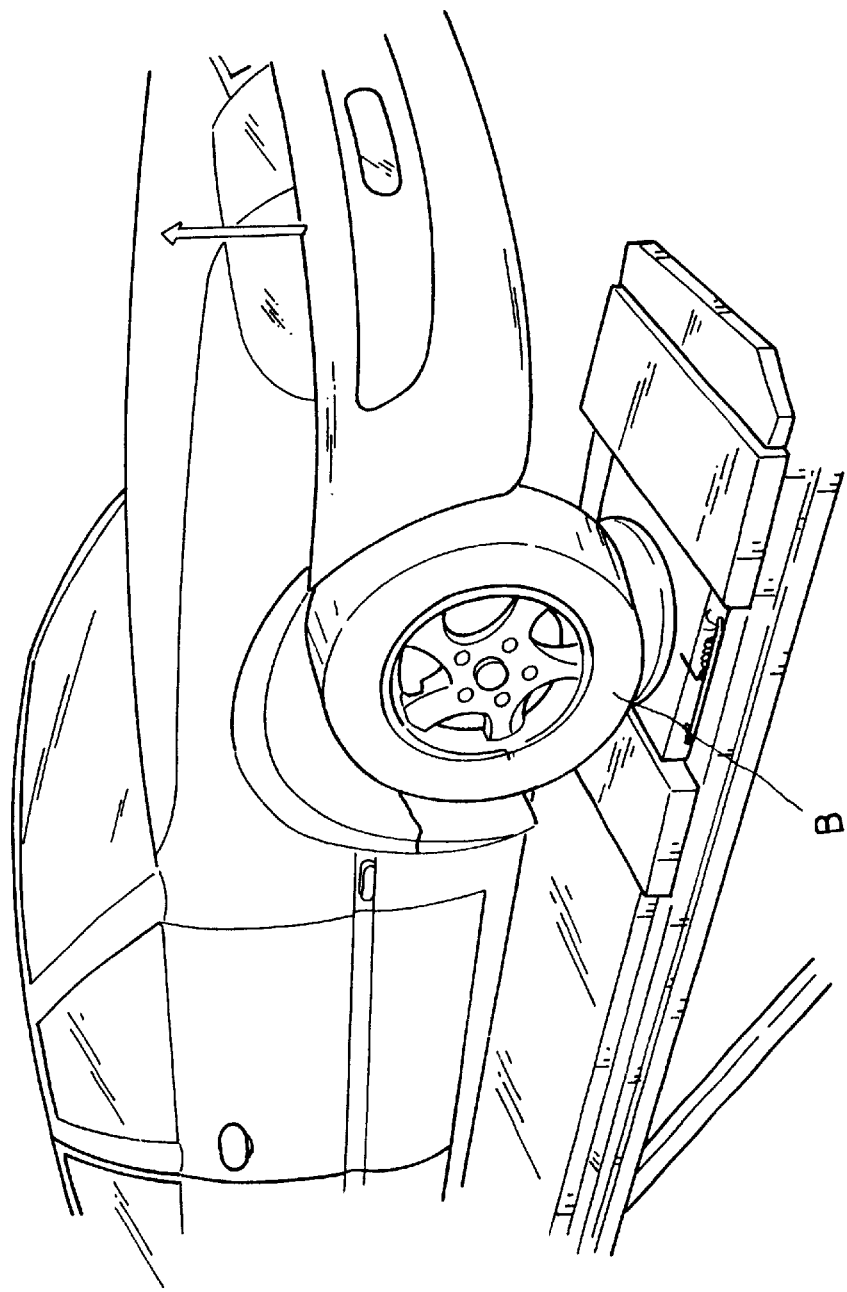
FIG. 1 is a schematic view illustrating a wheel pressing an angle rotating device for wheel alignment test of the prior art.
Figure 2:
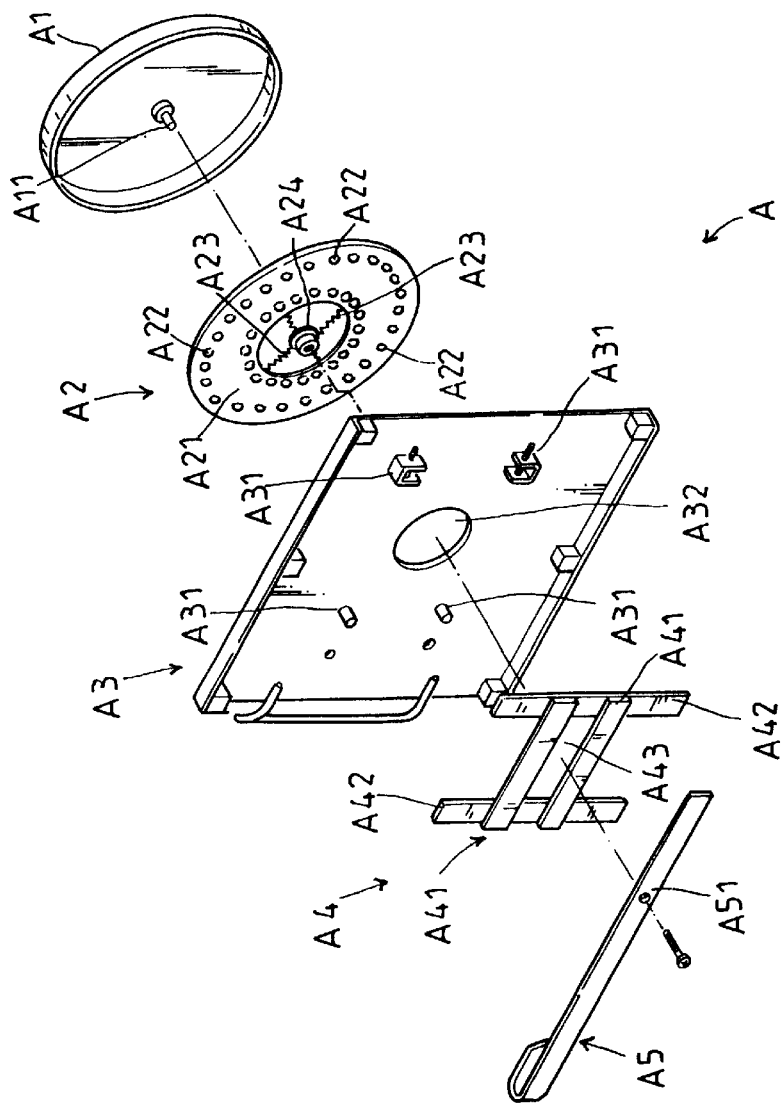
FIG. 2 is a perspective exploded view of an angle rotating device for wheel alignment test of the prior art.
Figure 2A:
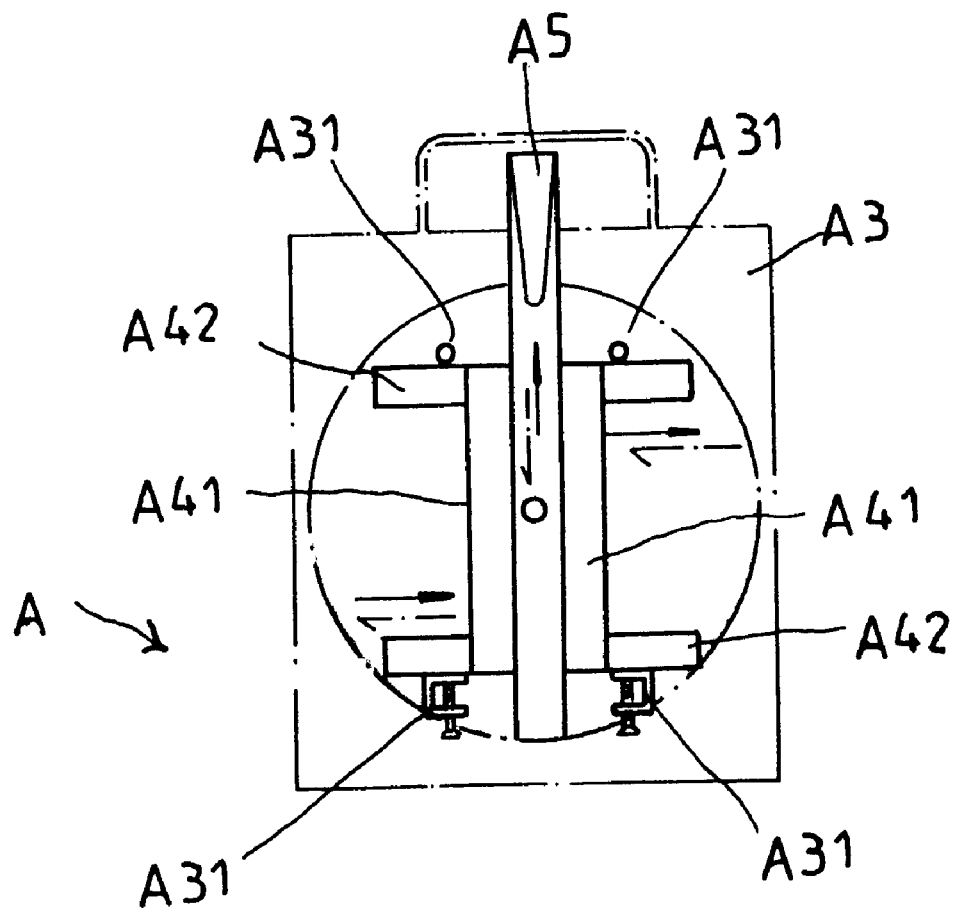
FIG. 2A is a schematic view illustrating an operation of an angle rotating device for wheel alignment test of the prior art.
Figure 3:
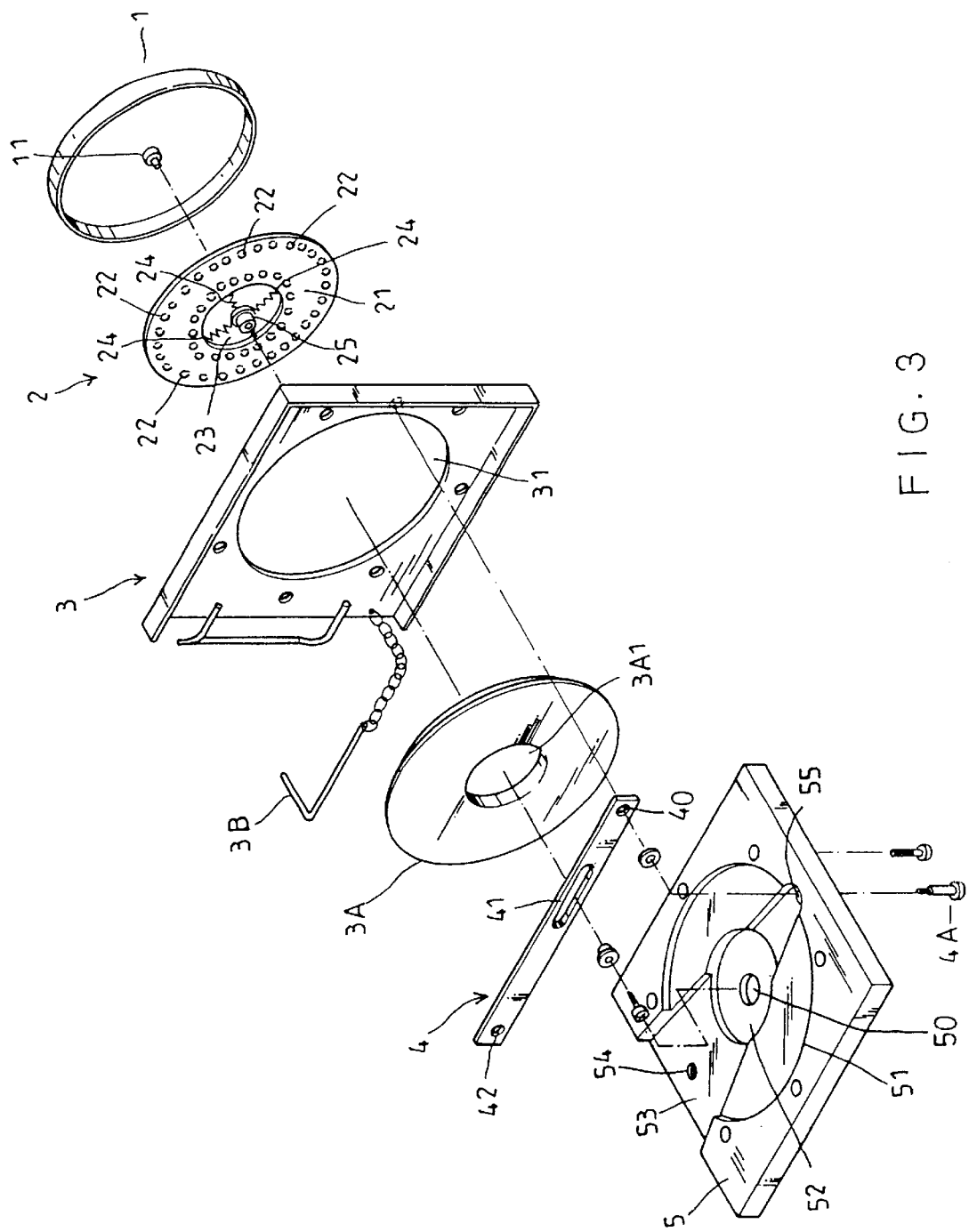
FIG. 3 is a perspective exploded view of an angle rotating device for wheel alignment test of a preferred embodiment in accordance with the present invention.
Figure 4A:
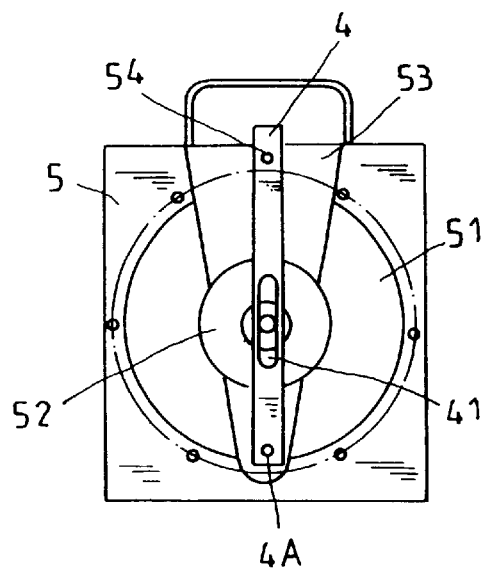
FIG. 4A is a schematic view illustrating an operation of an angle rotating device for wheel alignment test of a preferred embodiment in accordance with the present invention.
Figure 4B:
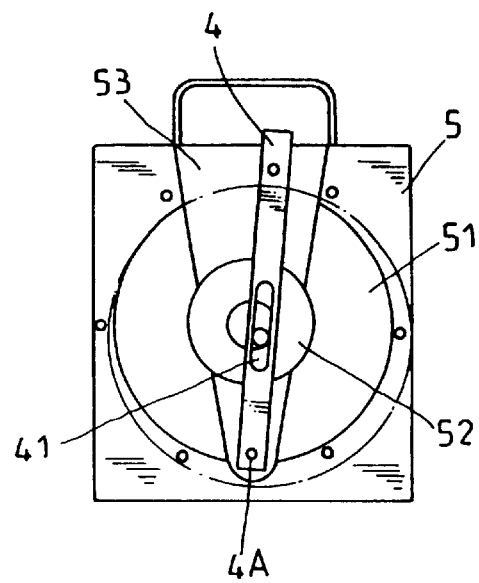
FIG. 4B is another schematic view illustrating an operation of an angle rotating device for wheel alignment test of a preferred embodiment in accordance with the present invention.
Figure 4:
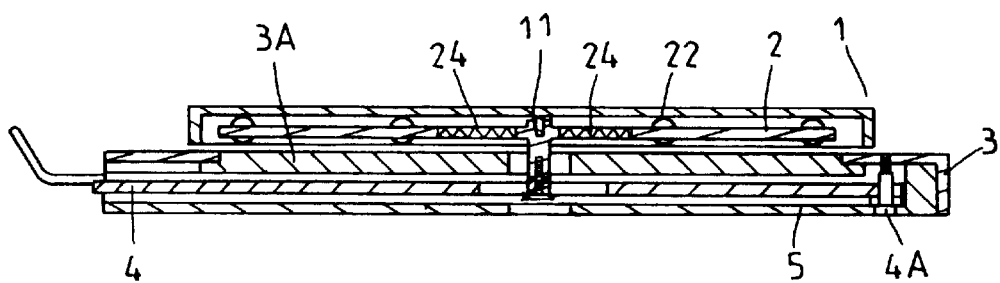
FIG. 4 is a sectional assembly view of an angle rotating device for wheel alignment test of a preferred embodiment in accordance with the present invention.
Figure 4C:
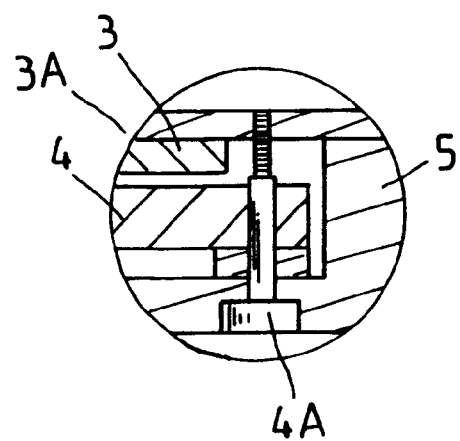
FIG. 4C is a partially enlarged sectional view of a solid rotating disk, a center sleeve, a cover plate, a lever bar, and a disk seat of a preferred embodiment in accordance with the present invention.
Figure 4D:
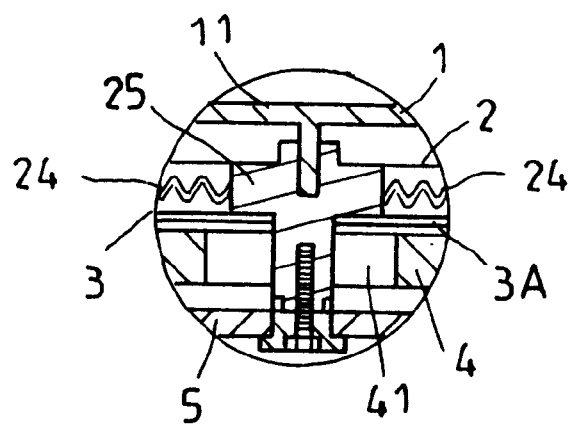
FIG. 4D is a schematic view illustrating a bolt inserted in a round hole of a lever bar.

Referring to FIGS. 3, 4, 4A, 4B, 4C, and 4D, an angle rotating device for wheel alignment test comprises a disk seat 5, a lever bar 4 inserted in the disk seat 5, a cover plate 3 covering the disk seat 5, a solid rotating disk 1 disposed on the cover plate 3, a ring 2 disposed in the solid rotating disk 1, and a hollow disk 3A disposed in the cover plate 3.

The disk seat 5 has a sector recess 53, two arc recesses 51, a center groove 52, a first round aperture 54, a second round apperure 55, and a center aperture 50.

The lever bar 4 has an oblong hole 41, a round hole 40, and a circular hole 42.

The hollow disk 3A has a center through hole 3A1.

The cover plate 3 has a round opening 31 receiving an upper portion of the hollow disk 3A.

A positioning pin 3B is connected to the cover plate 3.

The solid rotating disk 1 has a center shaft 11. The ring 2 has a central hole 23, an annular face 21 having a plurality of circular apertures receiving a plurality of balls 22. A sleeve 25 is disposed in the central hole 23 of the ring 2. A plurality of springs 24 are connected to the sleeve 25 and the ring 2.

The sector recess 53 of the disk seat 5 receives the lever bar 4.

The circular hole 42 of the lever bar 4 matches the first round aperture 54 of the disk seat 5.

The round hole 40 of the lever bar 4 matches the second round aperture 55 of the disk seat 5.

A bolt 4A is inserted in through the round hole 40 of the lever bar 4 and the second round aperture 55 of the disk seat 5.

The center shaft 11 passes through the sleeve 25, the center through hole 3A1, and the oblong hole 41.

Since the friction between the lever bar 4 and the hollow disk 3A is insignificant, the angle rotating device for wheel alignment test can sense a deflection angle of a wheel sensitively.

When the angle rotating device for wheel alignment test is not operated, the positioning pin 3B is inserted in the circular hole 42 of the lever bar 4 and the round aperture 54 of the disk seat 5.

The invention is not limited to the above embodiment but various modification thereof may be made. Further, various changes in form and detail may be made without departing from the scope of the invention.

I claim:

1. An angle rotating device for wheel alignment test comprises:

a disk seat, a lever bar inserted in the disk seat, a cover plate covering the disk seat, a solid rotating disk disposed on the cover plate, a ring disposed in the solid rotating disk, and a hollow disk disposed in the cover plate, the disk seat having a sector recess, two arc recesses, a center groove, a first round aperture, a second round aperture, and a center aperture, the lever bar having an oblong hole, a round hole, and a circular hole, the hollow disk having a center through hole, the cover plate having a round opening receiving an upper portion of the hollow disk, the solid rotating disk having a center shaft, the ring having a central hole, an annular face having a plurality of circular apertures receiving a plurality of balls, a sleeve disposed in the central hole of the ring, a plurality of springs connected to the sleeve and the ring, the sector recess of the disk seat receiving the lever bar, the circular hole of the lever bar matching the first round aperture of the disk seat, the round hole of the lever bar matching the second round aperture of the disk seat, a bolt inserted through the round hole of the lever bar and the second round aperture of the disk seat, and the center shaft passing through the sleeve, the center through hole, and the oblong hole.

2. The angle rotating device for wheel alignment test as claimed in claim 1, wherein a positioning pin is connected to the cover plate.

* * * * *